Feb. 11, 1969   D. J. BLUNDEN   3,426,704
DECK SECTION LOCK STRUCTURE
Filed Feb. 14, 1967

INVENTOR
DONALD J. BLUNDEN
BY
Whittemore, Hulbert & Belknap
ATTORNEYS

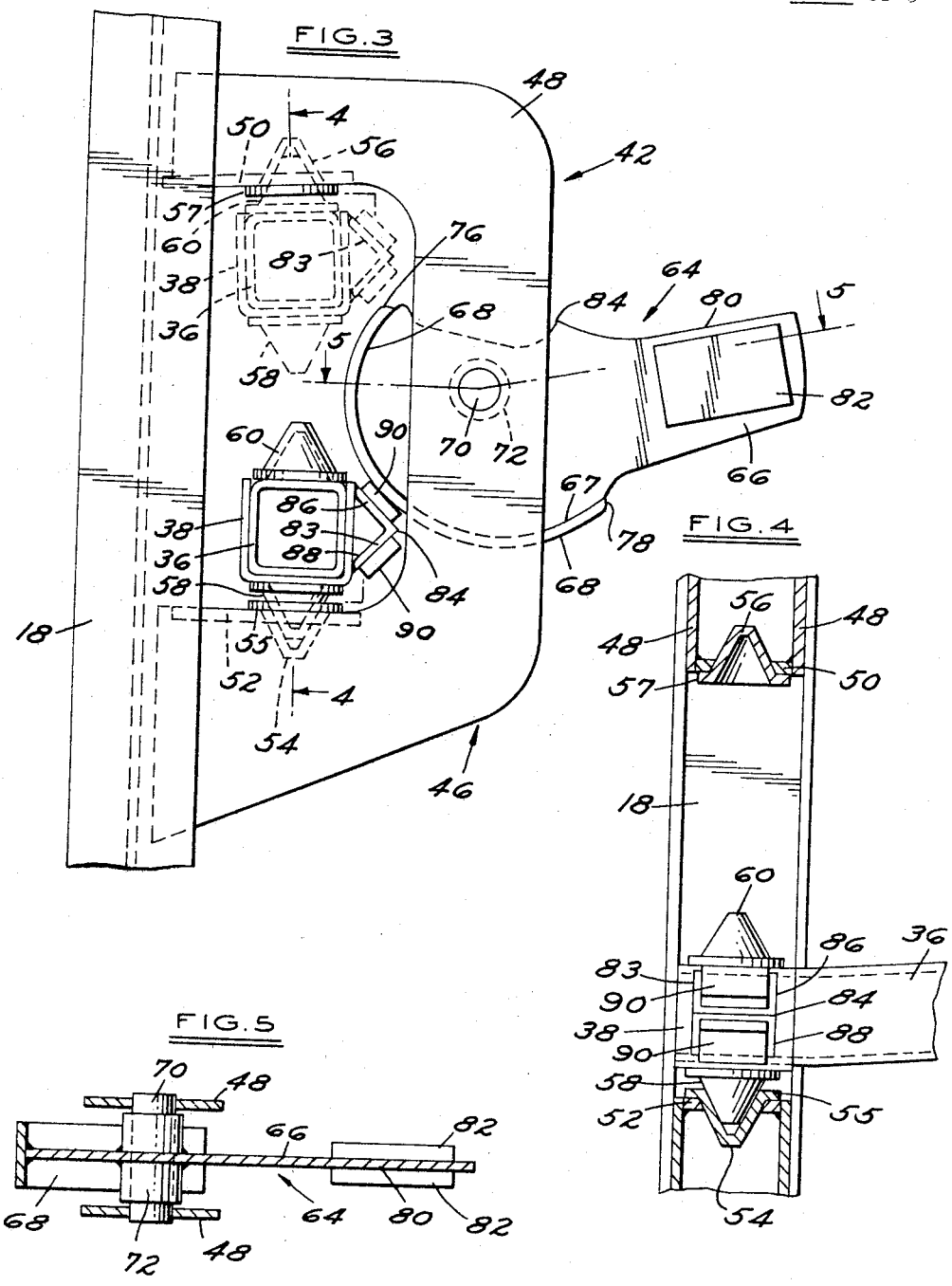

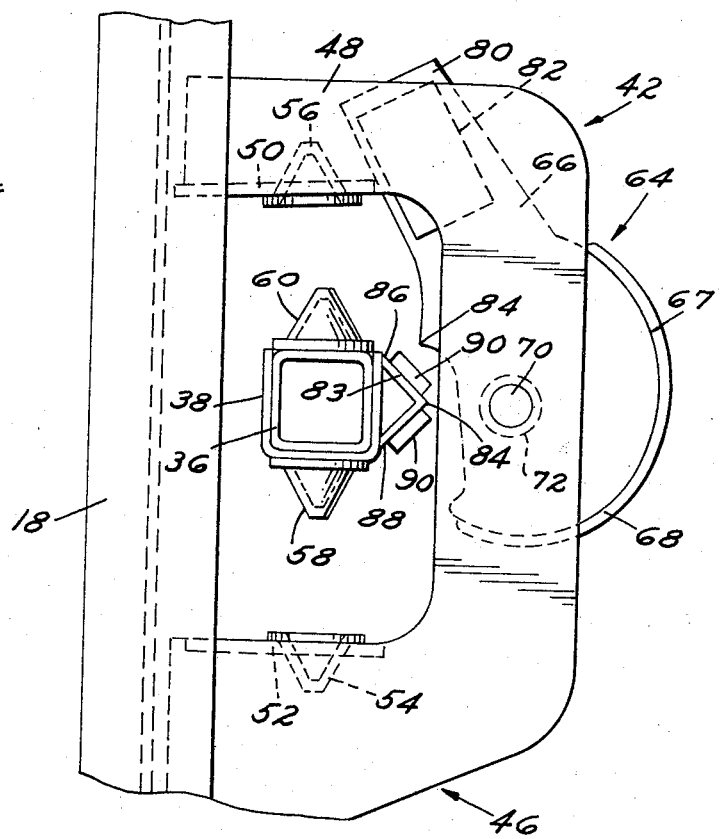

United States Patent Office 3,426,704
Patented Feb. 11, 1969

3,426,704
DECK SECTION LOCK STRUCTURE
Donald J. Blunden, Southfield, Mich., assignor to Whitehead & Kales Company, River Rouge, Mich., a corporation of Michigan
Filed Feb. 14, 1967, Ser. No. 616,022
U.S. Cl. 105—368                                14 Claims
Int. Cl. B61d 3/02; B65j 1/22

ABSTRACT OF THE DISCLOSURE

The lock structure of my invention is adapted for use with a vertically movable deck section of a transport vehicle. The transport vehicle may, for example, be a railroad flat car having vertically spaced upper, lower and middle decks adapted to carry vehicles. The middle deck has a deck section which is hinged to permit vertical swinging movement in order to facilitate loading and unloading the transport vehicle. The hinged deck section is swingable between upper and lower limiting positions, stops being provided to determine the locations of such upper and lower positions.

Cam members are provided for locking the deck section in its upper and lower positions. Each cam member is pivoted to the transport vehicle near the swinging end of the deck section. The cam member has an arcuate shoe which is eccentric with respect to the axis of pivotal movement of the cam member. The cam member is adapted to lock the deck section in its lower position (FIG. 3), to lock the deck section in its upper position (FIG. 6), and to release or unlock the deck section (FIG. 7).

The cam member is weighted so that it is urged by gravity to turn in one direction about its pivot axis and increase the wedging engagement of the eccentric shoe, whereby the cam member is self-tightening.

In the released position of the cam member (FIG. 7), the cam member is in a slightly over center position so that it will remain in the released position for the convenience of the operator. Should the cam member inadvertently be left in the released position, the vibration of the transport vehicle when in motion will be sufficient to swing the cam member from its released position to lock the deck section either in its upper or its lower position. The cam member also has a projecting part adapted to be engaged by the deck section when the latter swings upwardly to positively move the cam member from its released position.

Background of the invention

The invention pertains to the field of transport vehicles and has particular reference to the provision of a means for locking a vertically movable deck section in either a lower position or an upper position.

The lock structure is automatic in its operation, that is it will, by the nature of its construction, operate automatically to lock the deck section whether it is in its upper position or its lower position. The lock structure is also capable of being shifted to a released position freeing the deck section, and to remain in the released position. The lock structure is self-tightening and takes advantage of the normal vibrations which occur in the transport vehicle when it is in motion to effect a gradual tightening of the lock.

Summary of the invention

It is an essential object of the invention to provide an improved lock structure for a vertically movable deck section of a transport vehicle such, for example, as a railroad flat car.

Another object of the invention is to provide lock structure which is automatically operative to lock the deck section in either an upper or a lower position.

Another object is to provide lock structure for a vertically movable deck section, which is self-tightening.

Another object is to provide lock structure which comprises a cam member mounted on the transport vehicle adjacent a hinged deck section for movement from an operating range to a released position, the cam member in one position within the operating range engaging and locking the deck section in an upper position and in another position within the operating range engaging and locking the deck section in a lower position, and in its released position releasing the deck section.

Another object is to provide means for pivotally mounting the cam member on the transport vehicle, and to provide the cam member with an arcuate shoe which is eccentric to the axis of pivotal movement of the cam member, said shoe having a wedging locking engagement with the hinged deck section to hold it firmly in either its upper or its lower position.

Another object is to provide a cam member as described above which is self-tightening in response to the normal vibration which occurs during movement of the transport vehicle.

Other objects and features of the invention will become apparent as the description proceeds, especially when taken in conjunction with the accompanying drawings, wherein:

FIGURE 3 is a fragmentary view taken on the line 3—3 of FIGURE 2, showing in solid lines the crossbar of the hinged deck section locked in its lower position and showing in dotted lines the crossbar in its upper position.

FIGURE 4 is a fragmentary sectional view taken on the line 4—4 in FIGURE 3.

FIGURE 5 is a sectional view taken on the line 5—5 of FIGURE 3.

FIGURE 6 is a fragmentary view similar to FIGURE 3, showing the crossbar of the hinged deck section locked in its upper position.

FIGURE 7 is a view similar to FIGURE 6 but showing the lock structure in its released position.

Figure 1:
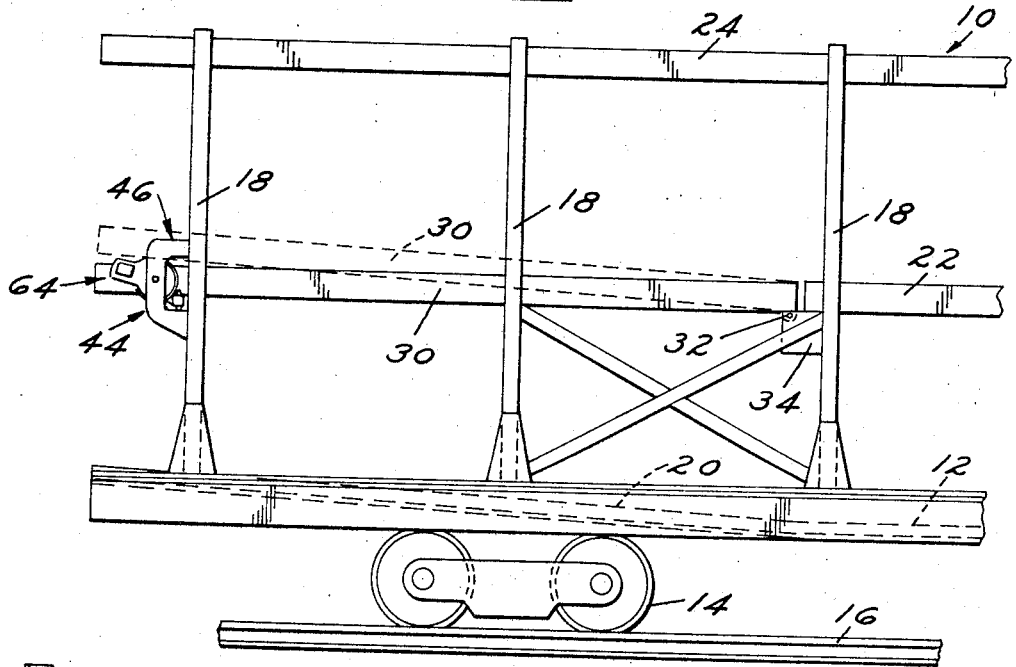
FIGURE 1 is a fragmentary side elevational view of a railroad flat car having a hinged, vertically swingable deck section and lock structure for the deck section, constructed in accordance with my invention.

Referring now more particularly to the drawings, the railroad flat car 10 there illustrated has an elongated generally horizontal lower deck or bed structure 12 extending lengthwise of the car and supported on the usual wheels 14 which are adapted to run on tracks 16. A plurality of vertical uprights 18 rise from the lower deck or bed structure 12 in two rows extending lengthwise of the railroad flat car along opposite sides thereof. The uprights 18 in each row are preferably uniformly spaced apart and are disposed opposite the uprights in the other row. The lower deck or bed structure 12, while horizontal throughout most of the length of the flat car, will be seen in FIGURE 1 to have an end section 20 which inclines upwardly.

Figure 2:
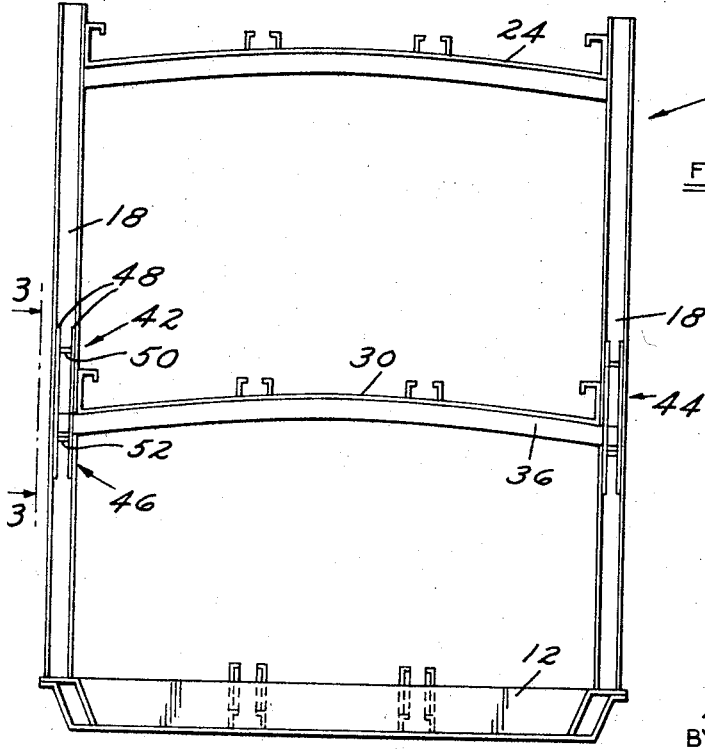
FIGURE 2 is an end view of the railroad flat car as seen from the left in FIGURE 1, the wheels being omitted.

The railroad flat car 10 also has a generally horizontal middle deck 22 which is spaced above the lower deck or bed structure 12 a distance preferably slightly greater than the maximum height of the vehicles to be transported by the flat car 10, and a generally horizontal upper deck 24 spaced above the middle deck 22 likewise a distance which is preferably slightly greater than the maximum height of the vehicles to be transported. The middle deck 22 and upper deck 24 are arched or crowned transversely slightly as shown in FIGURE 2 for increased clearance with respect to the vehicles carried on the deck beneath. The decks 22 and 24 are carried by the vertical uprights 18.

The middle deck 22 is rigidly secured in fixed horizontal position throughout most of its length, but has an end section 30 which is hinged to the flat car in any suitable manner as by pivots 32 carried by the supports 34 on uprights 18 permitting vertical swinging of the deck section 30. The deck section 30 will preferably be counter-balanced by any suitable means, not shown. This deck section 30 has at the swinging end a transverse tubular crossbar 36 (FIG. 3) which may be of square cross-section as shown, with caps 38 of generally U-shaped cross-section secured to the ends of the crossbar 36.

Two lock structures are provided for the hinged, vertically swingable deck section 30, one at each side of the flat car. One of the lock structures is generally designated 42, and the other is generally designated 44. The lock structure 42 is mounted on an upright 18 on one side of the flat car, and the lock structure 44 is mounted on the opposite upright 18 on the other side of the flat car. The lock structures 42 and 44 are adjacent the swinging end of the deck section 30 at the end of the flat car. Since these lock structures are of the same construction, only lock structure 42 will be described in detail.

As seen in FIGURES 2 and 3, lock structure 42 comprises a vertically disposed, generally U-shaped bracket 46. The bracket 46 is composed of a pair of U-shaped bracket plates 48 of substantially identical construction which are disposed in laterally spaced, parallel relation and are secured to one of the uprights 18 in vertical position. Extending between and connecting the plates 48 of the bracket are the upper and lower horizontal plates 50 and 52. As noted in FIGURES 2 and 4, the two ends of the crossbar of the hinged deck section 30 extends into the U of the brackets 46 between the upper and lower horizontal plates 50 and 52.

Referring particularly to FIGURE 3, each horizontal plate 50, 52 has a hole therethrough. Seated in the hole of the lower horizontal plate 52 is a hollow cone-shaped member 54 which has at the top an annular ring-shaped flange 55 seated upon the lower horizontal plate 52. The cone-shaped member 54 is fixedly secured to horizontal plate 52. There is a similar hollow cone-shaped member 56 which is inverted and disposed within the hole of the upper horizontal plate 50. The upper cone-shaped member 56 has around its lower end an annular ring-shaped flange 57 which is seated against the undersurface of the upper horizontal plate 50. The upper cone-shaped member 56 is fixedly secured to the upper horizontal plate 50.

There is secured to the bottom of each end cap 38 a cone-shaped member 58 which is of the same configuration as the cone-shaped member 54 to fit snugly within the latter. There is secured to the top of the cross-member 36 at each end thereof an inverted cone-shaped member 60 which is of the same configuration as the upper cone-shaped member 56 so as to fit snugly within the latter.

The deck section 30 is swingable from a lower limiting position in which the lower cone-shaped member 58 fits within the lower cone-shaped member 54 carried by the lower horizontal plate 52 (solid lines, FIGURE 3) to an upper limiting position in which the upper cone-shaped member 60 fits within the upper cone-shaped member 56 carried by the upper horizontal plate 50 (dotted lines, FIGURE 3). The cone-shaped members 54 and 56 are thus seen to be stops to determine the upper and lower limits of swinging movement of the deck section 30. Referring to FIGURE 1, the deck section 30 is shown in its lower limiting position in solid lines and in its upper limiting position in dotted lines. In the lower limiting position the deck section 30 is substantially horizontal to form a continuation of the adjacent fixed horizontal portion of the middle deck, and in the upper limiting position the deck section 30 is inclined in an upward direction.

Each lock structure 42, 44 includes a cam member 64. Cam member 64 has a flat plate in the general form of a lever and designated by the reference character 66. The plate 66 has a generally arcuate edge 67 at one end to which is secured a transverse arcuate strip or shoe 68. The shoe 68 is disposed at right angles to the plate 66 and extends throughout an arc of approximately 180°.

The cam member 64 is pivotally mounted to the U-shaped bracket 46 by a horizontal pin 70. The pin 70 extends between and is welded to the vertical bracket plates 48. A transverse sleeve 72 extends through and is secured to the plate 66 at right angles thereto and is rotatably mounted upon the pin 70. The shoe 68 of the cam member is eccentric with respect to the axis of pivotal movement of cam member 64 provided by pivot pin 70. Thus, the upper end 76 of shoe 68 is located nearer to the pivot axis of pin 70 than the lower end 78, and the radius of the shoe 68 gradually increases from the end 76 to the end 78.

The plate 66 of the cam member has a projecting arm portion 80, and weights 82 are secured to both sides of the arm portion 80 which tend to urge the cam member 64 in a clockwise direction from the position shown in FIGURE 3.

An angle-shaped member 83 is secured to a side flange of each end cap 38 of the crossbar 36. The angle-shaped member 83 is disposed so that the bend 84 between the flanges 86 and 88 of the angle-shaped member is horizontal. The flanges 86 and 88 are inclined as illustrated in FIGURE 3. The flanges 86 and 88 of the angle-shaped member 83 have shims 90 secured to the outer inclined surfaces thereof which are adapted to be engaged by the shoe 68 of the cam member.

The arrangement is such that the cam member 64 of each lock structure is adapted to lock the hinged deck section 30 in either its lower limiting position shown in solid lines in FIGURE 3, or its upper limiting position shown in solid lines in FIGURE 6, by engagement of the shoe 68 of the cam member 64 with one of the shims 90. The thickness or height of the shims 90 is such as to provide an effective engagement with shoe 68.

Referring to FIGURE 3, the crossbar of the hinged deck section 30 will be seen in solid lines to be locked in its lower limiting postion in which the lower cone-shaped member 58 is firmly seated within the lower cone-shaped member 54. Accordingly, the swinging end of the deck section 30 is securely held from horizontal movement by the engagement of the cone-shaped members 54 and 58 at both ends of the crossbar. The swinging end of the deck section 30 is adapted to be locked in this lower limiting position by the cam member 64. As seen in FIGURE 3, the shoe 68 of the cam member 64 engages upper shim 90 and positively prevents upward movement of the crossbar. The weights 82 tend to urge the cam member 64 in a clockwise direction and thereby increase the wedging engagement between shoe 68 and shim 90 because of the gradually increasing radius of the shoe.

During movement of the deck section 30 from its lower to its upper position the shims 90 follow a generally vertical path which is spaced from the hinge pin 70 a distance less than the smallest radius of the shoe 68, thereby assuring that when the deck section 30 is locked by cam member 64 in either its upper or its lower limiting position a positive lock is afforded.

FIGURE 6 shows the crossbar 36 in the upper limiting position of the deck section 30 in which the upper cone-shaped member 60 fits snugly within the upper cone-shaped member 56 thereby preventing any horizontal movement of the swinging end of the deck section. In the upper limiting position of the deck section 30, the cam member 64 while it is turned through a small arc in a clockwise direction from the position shown in FIGURE 3, nevertheless locks the deck section 30 in fixed position by engagement of its shoe 68 with the lower shim 90. Here again the weights 82 urge the cam member further in a clockwise direction to increase the wedging engagement between shoe 68 and the lower shim 90.

It will be understood that when the flat car is in motion, the normal vibrations will have a tendency to increase the wedging engagement between shoe 68 and a shim 90 by increasing the tendency of the cam member 64 to rotate in a clockwise direction.

FIGURE 7 illustrates the cam member 64 in its released position in which it frees or unlocks the swinging deck section 30. In this position of the cam member 64, its arm portion 80 rests against the upper horizontal plate 50 and the weight of the cam member 64 is slightly over center so that the cam member 64 will not swing clockwise from the position shown at least while the flat car is at rest. In FIGURE 7 the crossbar 36 of the swinging deck section 30 is shown in an intermediate position. Normally, the counter-balanced deck section 30 will eventually swing either to its upper limiting position or to its lower limiting position, particularly when the flat car is in motion. The vibration produced by the motion of the flat car will be sufficient to shake the cam member 64 from its over center released position shown in FIGURE 7 and to cause it to swing clockwise to its operating range shown in FIGURES 3 and 6, to lock the deck section 30 either in its upper or its lower position, depending on the limiting position to which it has moved.

It will also be noted in FIGURE 7 that the cam member 64 has a projection 84 on the plate 66 which is adapted to be engaged by the upper shim 90 upon movement of the crossbar upwardly to positively swing the cam member from its released position of FIGURE 7 clockwise into the operating range shown in FIGURES 3 and 6.

In use, the operator will lock the swinging deck section 30 in its upper limiting position shown in FIGURE 6 during loading of the lower deck or bed structure 12 of the flat car, so that the deck section 30 will clear the vehicles as they are moved onto the lower deck 12 across the inclined portion 20 thereof. Then in order to load the middle deck, the swinging deck section will be locked in its lower horizontal position shown in FIGURE 3 and in solid lines in FIGURE 1. The deck section will remain locked in its lower position during loading of the upper deck and subsequent transportation of the vehicles.

In order to unload the flat car, the upper deck may first be unloaded and then the middle deck may be unloaded during which time the swinging deck section 30 will remain locked in its lower position shown in FIGURE 3. Thereupon the operator will unlock the deck section 30 and re-lock it in its upper limiting position shown in FIGURE 6 in order to unload the lower deck of the flat car. To do this, he will move one cam member 64 to released position where it will remain while he moves from one side of the flat car to the other side where he will move the other cam member 64 to released position. Then he will raise the deck section 30 to its upper limit and re-lock both cam members 64. The deck section will preferably remain locked in its upper position to facilitate subsequent re-loading of the lower deck.

If for any reason the operator should, following the unloading of the flat car, leave the cam member 64 in the released position of FIGURE 7, in which the swinging deck section is unlocked, and subsequently the unloaded flat car is set in motion, the normal vibration of the flat car will be sufficient to swing one or both cam members from the FIGURE 7 released position into the operating range so as to lock the deck section 30 either in its upper or its lower limiting position depending on the position to which the deck section swings. As already stated, if the deck section 30 swings in an upward direction its upper shim 90 engages the projection 84 on the cam member to positively swing it clockwise to its operating range.

What I claim as my invention is:

1. A transport vehicle having a deck section movable vertically between upper and lower positions, lock structure for said deck section comprising a cam member having a shoe, means pivotally mounting said cam member on said transport vehicle adjacent said deck section for movement through an operating range to a released position, said shoe in one position of said cam member within said operating range engaging and locking said deck section in said upper position and in another position of said cam member within said operating range engaging and locking said deck section in said lower position and in the released position of said cam member releasing said deck section.

2. A transport vehicle having a deck section movable vertically between upper and lower positions, upper and lower stops on said transport vehicle determining said upper and lower positions of said deck section, lock structure for said deck section comprising a cam member, means mounting said cam member on said transport vehicle adjacent said deck section for movement through an operating range to a released position, said cam member in one position within said operating range engaging and locking said deck section in said upper position firmly against said upper stop and in another position within said operating range engaging and locking said deck section in said lower position firmly against said lower stop and in the released position releasing said deck section.

3. The transport vehicle defined in claim 2, wherein said cam member is automatically operative to lock said deck section in either its upper or lower position when said transport vehicle is in motion.

4. The transport vehicle defined in claim 2, wherein said cam member is pivotally mounted on said transport vehicle and has a shoe eccentric with respect to its axis of pivotal movement, said shoe engaging and locking said deck section firmly against said upper and lower stops in said upper and lower positions as aforesaid with a wedging action.

5. The transport vehicle defined in claim 4, wherein means are provided to urge said cam member in one direction about its pivot axis and increase the wedging engagement of said shoe upon said deck section.

6. The transport vehicle defined in claim 4, wherein said cam member is so weighted as to be urged by gravity to turn in one direction about its pivot axis and increase the wedging engagement of said shoe upon said deck section, whereby said cam member is self-tightening.

7. A transport vehicle having a hinged, vertically swingable deck section, lock structure for said deck section comprising a cam member, means pivotally mounting said cam member on said transport vehicle adjacent the swinging end of said deck section for movement through an operating range to a released position, said cam member having a shoe eccentric with respect to its axis of pivotal movement, said deck section having means cooperable with said cam member including inclined surfaces adapted to be engaged by said shoe, upper and lower stops on said transport vehicle determining upper and lower limiting positions of said deck section, said shoe, in one position of said cam member within said operating range, engaging one of said inclined surfaces with a wedging action to lock said deck section in said upper position firmly against said upper stop, said shoe, in another position of said cam member within said operating range, engaging the other of said inclined surfaces with a wedging action to lock said deck section in said lower position firmly against said lower stop, said cam member in its released position reelasing said deck section.

8. The transport vehicle defined in claim 7, wherein said cam member has an arm extending radially outwardly from the pivot axis of said cam member, and a weight on said arm urging said cam member to turn in one direction and increase the wedging engagement of said shoe upon said inclined surfaces, whereby said cam member is self-tightening.

9. The transport vehicle defined in claim 8, wherein said inclined surfaces move in a substantially vertical path when said deck section swings vertically, the pivot axis of said cam member is spaced to one side of said path, and said shoe throughout the operating range of movement of said cam member intersects said path.

10. The transport vehicle defined in claim 9, wherein said cam member has a projection adapted when said cam member is in released position, to be engaged by one of said inclined surfaces upon swinging of said deck section in one direction to turn said cam member to its operating range.

11. The transport vehicle defined in claim 10, wherein said cam member is automatically operative to lock said deck section in either its upper or lower position when said transport vehicle is in motion.

12. A transport vehicle having a deck section movable vertically between upper and lower positions, lock structure for said deck section comprising a cam member having a locking portion, means mounting said cam member on said transport vehicle adjacent said deck section for movement in a predetermined path through an operating range to a released position, said locking portion in one position of said cam member within said operating range engaging and locking said deck section in said upper position and in another position of said cam member within said operating range engaging and locking said deck section in said lower position and in the released position of said cam member releasing said deck section.

13. A transport vehicle having a deck section movable vertically between upper and lower positions, lock structure for said deck section comprising a locking member, means mounting said locking member on said transport vehicle adjacent said deck section for movement in a predetermined path through an operating range to a released position, said locking member in one position within said operating range engaging and locking said deck section in said upper position and in another position within said operating range engaging and locking said deck section in said lower position and in its released position releasing said deck section.

14. The transport vehicle defined in claim 13, wherein said locking member is pivotally mounted on said transport vehicle.

References Cited

UNITED STATES PATENTS

| | | | |
|---|---|---|---|
| 2,587,456 | 2/1952 | Francis | 296—1 |
| 2,778,672 | 1/1957 | Huebshman | 296—1 |
| 3,145,043 | 8/1964 | Gyori et al. | 296—1 |
| 3,180,285 | 4/1965 | Gutridge | 105—368 |

DRAYTON E. HOFFMAN, *Primary Examiner.*

U.S. Cl. X.R.

105—370